March 26, 1935.  S. B. SANFORD  1,995,721
RETARDING DEVICE
Filed Aug. 5, 1933  4 Sheets-Sheet 1

Selden Bradley Sanford INVENTOR
BY *(signature)* ATTORNEY

March 26, 1935.  S. B. SANFORD  1,995,721
RETARDING DEVICE
Filed Aug. 5, 1933  4 Sheets-Sheet 2

Selden Bradley Sanford INVENTOR
BY Walter E. Bradley ATTORNEY

March 26, 1935.                S. B. SANFORD                1,995,721
                             RETARDING DEVICE
                          Filed Aug. 5, 1933          4 Sheets-Sheet 4

Selden Bradley Sanford  INVENTOR
BY Halter E. Bradley  ATTORNEY

Patented Mar. 26, 1935

1,995,721

UNITED STATES PATENT OFFICE 1,995,721

RETARDING DEVICE

Selden Bradley Sanford, Yonkers, N. Y., assignor to Otis Elevator Company, New York, N. Y., a corporation of New Jersey Application August 5, 1933, Serial No. 683,762

5 Claims. (Cl. 188—98)

The invention relates to retarding devices and particularly to retarding devices for electromagnetic switching mechanisms.

The principal object of the invention is to provide a retarding device which is not subject to variations and retains its accuracy over extended periods of operation.

A feature of the invention resides in the provision of a retarding device which is not affected by temperature or humidity changes.

Another feature of the invention is the provision of a retarding device which can not be affected by dust and dirt.

Other features and advantages will be apparent from the following description and appended claims.

The invention involves the utilization of air or similar fluid which is caused to pass through an orifice from one chamber to another in producing the retarding action. The retarding device is sealed against any dust or dirt. This sealing of the device also provides that the same air or the like is used in each retarding operation.

In carrying out the invention in accordance with the preferred arrangement, a flexible membrane is employed to act as a bellows to transfer the fluid, hereinafter referred to as air, from one chamber to another. This membrane forms a part of one of these chambers and acts to increase or decrease the pressure of air in the chamber. This action causes the transfer of air between the chambers, suitable mechanism being provided to regulate the rate at which this transfer takes place. The other chamber is also provided with a flexible membrane forming at least part of the wall thereof which permits an increase or decrease in the volume of the chamber as the transfer of air takes place, depending upon whether the transfer is to or from this other chamber. These flexible membranes, suitably mounted, form the seal which prevents the entrance of any dust or dirt into the chambers.

The invention will be described as applied to various forms of switching mechanisms but it is to be understood that the retarding device is for general application.

Figure 1:
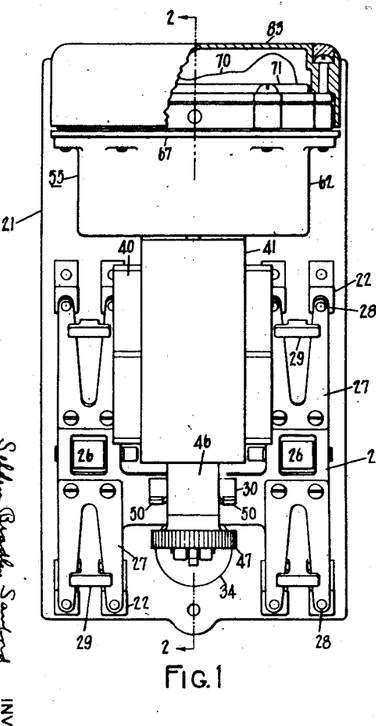
Figure 1 is a front view, with parts in section, of the retarding device applied to switching mechanism, the retarding device being arranged to provide retardation on a suction stroke.
Figure 2:
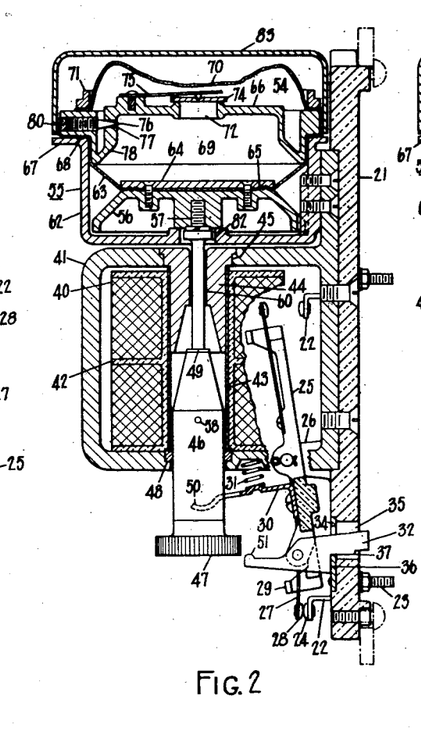
Figure 2 is a section taken along the line 2—2 of Figure 1, with the mechanism in position at the end of the suction stroke.
Figure 3:
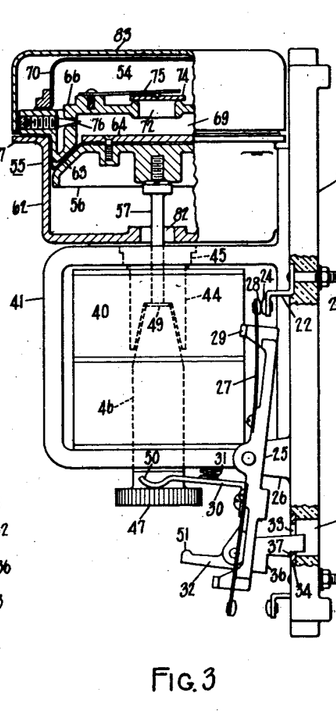
Figure 3 is a side view, with parts in section, illustrating the mechanism in position ready to begin the suction stroke.

Referring to Figures 1, 2 and 3 of the drawings, the switching mechanism comprises a plurality of stationary contacts, secured to an insulating base 21, and movable contacts for engaging the stationary contacts. Eight stationary contacts are illustrated, each of them being of the same construction. The construction of one of these stationary contacts is shown in Figure 3. It comprises a contact bracket 22 secured to the insulating base 21 by a terminal stud 23. The bracket is provided with a contact point 24 of suitable material such as silver or tungsten.

The movable ones of the switch contacts are carried by an operating lever 25 of insulating material. This operating lever is of an H construction and is pivoted to base 21 by pivot pins supported by lugs 26 formed on the base. Each of the movable contacts comprises a leaf spring 27 of U-shaped construction. The ends of the arms of the contact springs contact with the stationary contacts, thereby forming a bridge to connect pairs of stationary contacts together. The contacting end of each arm of each spring is provided with a contact point 28 for engaging the contact point 24 of its cooperating stationary contact. The other ends of the contact springs are secured, as by screws, to the operating lever 25. The arms of each spring extend through slots formed by T-shaped guards 29 on the operating lever. This arrangement protects the contact springs by preventing their being moved into positions where their elastic limit is exceeded.

In the arrangement illustrated, the lower contacts are breaking contacts while the upper ones are making contacts, two sets of making contacts and two sets of breaking contacts being provided in the arrangement shown. An operating arm 30 is secured to the operating lever 25 as by screws. A spring 31 acts against operating arm 30, tending to bias the operating lever 25 into position with the lower or breaking contacts engaged and the upper or making contacts separated. This position of the parts is illustrated in Figure 2. A latch 32 is pivoted to the operating lever 25 and extends through a slot 33 in a stop plate 34 secured to base 21 over an aperture 35. This latch is provided with a shoulder 36 which cooperates with the stop plate 34 to limit the movement of the operating lever counterclockwise under action of spring 31.

Upon the operating lever being moved clockwise about its pivot against the force of spring 31, the breaking contacts separate and the making contacts engage. Upon continued movement of the operating lever after engagement of the making contacts, the latch 32 is moved into position where another shoulder 37 formed thereon falls into position with respect to stop plate 34 to latch the operating lever in the position to which it is moved with the making contacts in engagement. This position of the parts is illustrated in Figure 3.

As the clockwise movement of the operating lever 25 takes place, spring 31 is compressed so that, upon counterclockwise movement of latch 32 about its pivot to release shoulder 37 from stop plate 34, the spring returns the operating lever and contacts to the positions illustrated in Figure 2.

Clockwise movement of the operating lever 25 about its pivot is effected by an electromagnet 40. This electromagnet is supported by frame 41 secured to insulating base 21 as by screws. The magnet coil is wound on the spool 42 provided with a sleeve 43, preferably of seamless brass tubing. The magnet is provided with a stationary core 44 fitted into an aperture 45 in frame 41. The core 44 extends downwardly within the sleeve 43 partially through the coil and is secured to the frame in any suitable manner. The magnet is also provided with a movable core 46 arranged to be pulled upwardly by the magnet upon energization thereof. This movable core is made in two parts for assembly purposes, the lower part or end piece being designated 47. The movable core extends through an aperture in frame 41, this aperture being provided with a self-lubricating bushing 48 to guide the core in its upward and downward movement. The upper end of core 46 is tapered and the stationary core 44 is correspondingly formed to receive it. This is done to provide the proper pull characteristics of the magnet. A brass washer 49 is provided on the tapered end of core 46 to prevent sticking after the movable core has been moved to attracted position by the electromagnet.

Upon the energization of the electromagnet, core 46 is pulled upwardly into position where washer 49 engages stationary core 44. As this movement takes place, the end piece 47 engages fingers 50 on operating arm 30 to move the operating lever 25 clockwise about its pivot against the force of spring 31. Sufficient upward movement of movable core 46 takes place to permit latch 32 to lock the operating lever 25 in position with the making contacts engaged and the breaking contacts separated.

Upon deenergization of the magnet, the movable core 46 drops and strikes the protruding end 51 of latch 32. This causes counterclockwise movement of the latch about its pivot to release the contact lever 25. The spring 31 thereupon moves the contact lever counterclockwise about its pivot, returning the contacts to the position with the making contacts separated and the breaking contacts engaged.

The rate of downward movement of movable core 46 is governed by the retarding device 55. This retarding device comprises an operating plunger 56 secured to the movable core 46 by means of a plunger shaft 57. This plunger shaft extends into the movable core to which it is secured as by a pin 58. From the movable core the shaft extends upwardly through an aperture 60 formed in the stationary core 44 to the operating plunger 56, into which it is threaded. The end piece 47 is preferably knurled to facilitate this assembly. A lock washer is provided between a shoulder formed on the plunger shaft and the operating plunger to lock the parts in assembled relation.

The operating plunger 56 is arranged within a housing 62 secured to frame 41 as by screws. A membrane 63 is provided within the housing. This membrane is preferably of a fine grade of thin, soft and flexible leather, treated in such manner as to render it impervious to air. An oil treated tanned leather such as used on player pianos has been found satisfactory. This membrane is secured to the operating plunger by a disc 64 clamped to the plunger as by screws. Circular ridges 65 are formed on the top of the plunger for cooperating with circular grooves formed on the disc 64. When the disc is secured to the plunger, the membrane is forced into the grooves by the ridges. This forms a seal to prevent the escape of air, through the holes provided for the screws, from one side of the membrane to the other.

The membrane is also secured to the housing by means of the valve head 66. The housing is formed with a flange portion 67. The valve head is formed with circular ridges 68 for cooperating with circular grooves formed in the flange portion of the housing. The membrane extends outwardly between the flange portion 67 and valve head 66 so that it is forced into the grooves by the ridges. This forms a seal for the membrane where it is joined to the housing, to prevent the escape of air to or from the chamber 69 formed by the membrane and the valve head 66. The valve head 66 extends downwardly into the housing 62 for a distance approximately equal to one-half the total stroke of operating plunger 56. Also, the diameter of this depending portion of the valve head is such as to press the membrane 63 snugly against the wall of the housing. This arrangement, together with the fact that the disc 64 is of considerable diameter, as illustrated, causes the membrane to act as a diaphragm upon upward and downward movement of the operating plunger.

Another membrane 70 is secured on top of the valve head 66 as by a ring 71. This ring and valve head are secured to the housing as by screws extending downwardly through apertures in lugs formed on the ring and the valve head into threaded apertures in flange portion 67. This membrane also is preferably of a fine grade of thin, soft and flexible leather, and may be of the same material as that of the membrane 63. Also, soft Havana Skinner leather is satisfactory. The membrane 70 is preferably treated in such manner as to render to impervious to air.

An enlarged aperture 72 is provided in the center of the valve head and forms a passage between the lower chamber 69 and the upper chamber 54 formed by membrane 70 and the valve head 66. The valve head is formed with a circular lip portion about the opening 72 and at the top thereof to form a valve seat. The valve 74 for this seat is in the form of a disc retained in place by means of a spring 75. This spring is secured at one end to the valve head and provided at its other end with a small pin arranged to extend into a depression formed in the disc to retain the disc in proper position with respect to the valve seat. This disc is preferably of nitralloy having a ground and highly polished seating surface. The seating surface of the valve seat is also preferably ground and polished.

An adjustable needle valve 76 extends through the side of the valve head into cooperating relation with an aperture 77 formed in an inner wall 78 of the valve head. The inner wall, being spaced inwardly from the outer wall of the valve head, provides an auxiliary chamber communicating with and forming a part of the upper chamber 54. Adjustment of the needle valve with respect to aperture 77 governs the rate of flow of air from the upper chamber 54 to the lower chamber 69. In this manner, the rate of downward movement of operating plunger 56 may be adjusted. When the desired adjustment is obtained, the threaded aperture in the outer wall of the valve head into which the needle valve extends, is sealed with some suitable material, such as wax, as indicated at 80. This prevents the retarding device getting out of adjustment.

Upon energization of electromagnet 40, the movable core is immediately pulled into its upper position. This core acts through shaft 57 to move operating plunger 56 upwardly into the position illustrated in Figure 3. As the upward movement of operating plunger 56 takes place, the diaphragm 63 is moved upwardly and acts in the nature of a bellows to decrease the size of chamber 69. Before the upward movement of the operating plunger takes place, the pressure of the air in chamber 69 is the same as that of the air in chamber 54. However, as the plunger moves upwardly, the bellows action of the diaphragm decreases the volume of air in chamber 69 and therefore increases the pressure of the air therein. The size of aperture 72 is such that total pressure of the air required to lift valve 74 off its seat is had almost immediately the upward movement of the plunger begins. This permits the unrestricted flow of air from chamber 69 through aperture 72 into chamber 54 as the upward movement of the plunger takes place. Thus, the upward movement of the movable core 46 is unrestricted, causing immediate movement of operating lever 25 into position to latch the making contacts in engagement and the breaking contacts in separated condition.

As the upward movement of the operating plunger 56 ceases, valve 74 reseats itself under the influence of spring 75, thereby restricting communication between the upper and lower chambers of the retarding device to the aperture 77. Increasing the volume of air in chamber 54, as the flow of air from chamber 69 into chamber 54 takes place, inflates the membrane 70. However, the volume of air in the chambers is not sufficient to inflate membrane 70 to its full extent as operation of the retarding device takes place, the membrane being shown fully inflated in Figure 3 simply to illustrate a suitable shape for the membrane.

Upon the deenergization of magnet 40, core 46 moves downwardly under the influence of gravity. However, the core does not fall freely, its downward movement being retarded by the retarding device. As the operating plunger 56 begins its downward movement it increases the volume of air in chamber 69, thereby decreasing the pressure of the air. This causes the flow of air from chamber 54 back into chamber 69. This return flow of air being restricted to aperture 77, the air is returned at a comparatively slow rate, depending upon the adjustment of needle valve 76. The air continues to return from chamber 54 to chamber 69 at this same rate during the whole downward movement of core 46, thereby causing the entire return movement of the core 46 to take place at a rate determined by the adjustment of needle valve 76.

When the end piece 47 of the core 46 nears its lowermost position, it engages the protruding end 51 of latch 32, and thereafter moves the latch counterclockwise about its pivot to release the shoulder 37 from the stop plate 34. As this release takes place, spring 31, acting through operating arm 30, acts to return the operating lever 25 into position with the breaking contacts in engagement and the making contacts separated, as shown in Figure 2. The downward movement of the core 46 is brought to a stop by the engagement of operating plunger 56 with a boss formed on housing 62.

An aperture 82 formed in housing 62 and through which the plunger shaft 57 extends, permits the unrestricted flow of air to and from the housing as the diaphragm 63 is moved upwardly and downwardly within the housing as a result of energization and deenergization of magnet 40. Likewise, the diameter of the operating plunger 56 is such as to allow considerable clearance between the plunger and the wall of housing 62. This permits the unrestricted flow of air to and from the space between the operating plunger and diaphragm 63 as downward and upward movement of the plunger takes place.

A cover 83 is provided for the retarding device. This cover is secured to the housing as by screws extending downwardly through apertures formed in the cover and through apertures in certain of the lugs formed on the ring 71 and valve head 66. Clearance is provided between the cover and valve head to permit unrestricted flow of air to and from the space between the cover and membrane 70 as the membrane is inflated and deflated in the operation of the retarding device. With these clearances, the air in chambers 54 and 69 is maintained at atmospheric pressure except for the change in pressure in chamber 69 when the retarding device is being operated.

Figure 4:
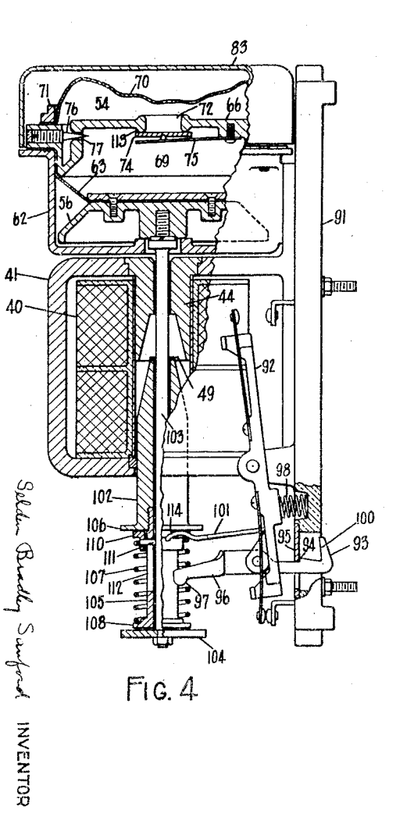
Figure 4 is a side view, with parts in section, of the retarding device applied to another arrangement of switching mechanism, the retarding device being arranged to provide retardation on a compression stroke.
Figure 5:
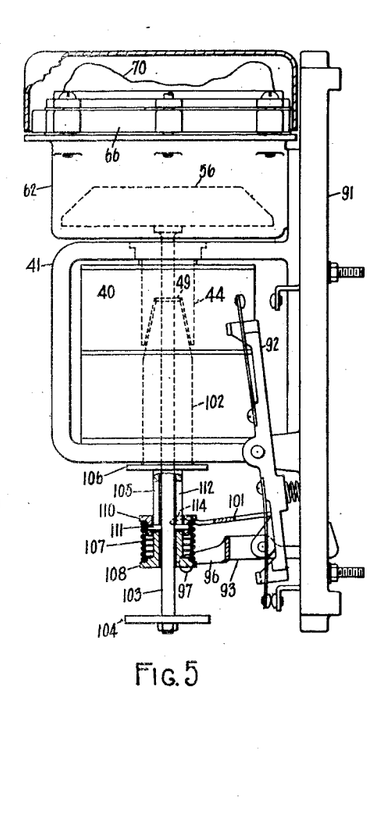
Figure 5 is a side view of the same, with parts in section, illustrating the mechanism in position ready to begin the compression stroke.
Figure 6:
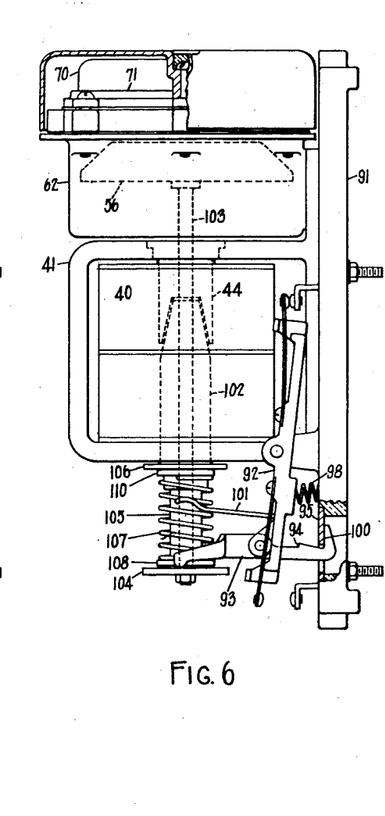
Figure 6 is a side view of the same, similar to Figure 5, with the compression stroke of the retarding device completed.

As distinguished from the arrangement shown in Figures 1, 2 and 3, in which the retarding device is of the suction type, the retarding action is obtained on the compression stroke in the mechanism illustrated in Figures 4, 5 and 6. The switching mechanism illustrated in Figures 4, 5 and 6 is substantially of the same construction as that shown in Figures 1, 2 and 3, the movable contacts being in the form of U-shaped contact springs for bridging pairs of stationary contacts mounted on insulating base 91. The movable contacts are mounted on operating lever 92 pivotally supported by base 91. The lever 92 pivotally supports a latch 93. This latch, however, is of a different construction from that illustrated in Figures 1, 2 and 3, in that it is provided with a shoulder 94 which cooperates with a stop plate 95 to latch the operating lever 92 into position with the breaking contacts in engagement and the making contacts separated. The other end of the latch 93 is formed with two arms 96 having ends 97 protruding downwardly. Upon clockwise movement of latch 93 about its pivot, it releases the shoulder 94 from stop plate 95 and a spring 98 arranged between the contact lever 92 and base 91 thereupon moves lever 92 clockwise into position to separate the breaking contacts and engage the making contacts. The latch is provided with a further shoulder 100, which engages the stop plate 95 to limit the amount of clockwise movement of lever 92 about its pivot. An operating arm 101 is secured to the contact lever for returning the lever counterclockwise against the force of spring 98 to latch the lever in position with the making contacts separated and the breaking contacts in engagement.

The electromagnet 40, frame 41 and stationary core 44 are of the same construction as the magnet frame and stationary core of Figures 1 and 3. It is preferred to transmit the movement of core 102 to the shaft through the intermediary of a spring. Such arrangement has been illustrated in which core 102 is slidably mounted on shaft 103. On the lower end of the shaft 103, a disc 104 is secured as by a nut against a shoulder formed on the shaft. A sleeve 105 is slidably arranged on the shaft between disc 104 and a flange 106 formed on the bottom of core 102. This sleeve is threaded into an aperture in the bottom of core 102 so as to slide with the core upon shaft 103. A spring 107 is arranged over the sleeve between a spring seat 108 formed on the sleeve and a spring seat 110 secured to the shaft 103 as by pin 111. This pin extends through oppositely disposed vertically extending slots 112 formed in the sleeve to permit relative movement of sleeve 105 with respect to the shaft 103.

The retarding device has the valve 74 arranged beneath opening 72 to engage a valve seat 113 formed by a circular lip portion about opening 72 but at the bottom thereof. The valve 74 is biased to closed position by spring 75 as in the case of Figures 1, 2 and 3. Otherwise, the retarding device is of the same construction as that illustrated in Figures 1, 2 and 3.

With this arrangement, upon energization of electromagnet 40, the core 102 is immediately pulled upwardly into the brass sleeve until washer 49 engages stationary core 44. The core 102 pulls with it the sleeve 105. The upward movement of shaft 103, however, is delayed by the action of the retarding device. Thus, as the sleeve 105 moves upwardly, it compresses the spring 107 between spring seats 108 and 110. As spring 107 is compressed, it starts to expand, acting through spring seat 110 and pin 111 to push shaft 103 upwardly. This compresses the air in chamber 69, forcing it through the aperture 77 in valve head 66 to the upper chamber 54. Owing to the restriction of the area of aperture 77 by needle valve 76, the transfer of air from chamber 69 to chamber 54 takes place at a slow rate. Therefore, the shaft 103 can move upwardly only at a slow rate. The rate at which the air can flow from chamber 69 into chamber 54 is determined by the setting of needle valve 76. As shaft 103 nears its upper position, disc 104 engages the protruding ends 97 of latch 93, moving the latch clockwise about its pivot to release shoulder 94 from stop plate 95. Thereupon spring 98 moves contact lever 92 into position with the breaking contacts separated and the making contacts in engagement, as illustrated in Figure 6. The upward movement of shaft 103 is stopped by the engagement of spring seat 110 with flange 106 on core 102. The transmission of the upward movement of core 102 to shaft 103 through spring 107 is desirable in order to obviate any variations in timing due to voltage or other fluctuations which might affect the pull on core 102.

Upon deenergization of electromagnet 40, the operating plunger 56, shaft 103, core 102, sleeve 105, spring 107 and disc 104 are returned as a unit under the action of gravity into their positions illustrated in Figure 4. As the downward movement of operating plunger 56 takes place, the valve 74 is lowered off its seat as a result of decreased air pressure in chamber 69 to permit unrestricted flow of air from chamber 54 to chamber 69, and thus unrestricted downward movement of the core 102 and associated parts. As this downward movement takes place, the fingers 114 of operating arm 101 are engaged by flange 106 of core 102, moving arm 101 downwardly. This moves operating lever 92 counterclockwise about its pivot against the force of spring 98 into position to latch the breaking contacts in engagement and the making contacts separated. The downward movement of core 102 and associated parts is brought to a stop by the engagement of operating plunger 56 with the boss formed on housing 62.

Where variations in timing are not objectionable, the movable core 102 may be secured directly to plunger shaft 103. With this arrangement the upward movement of shaft 103 due to the magnetic pull of electromagnet 40, when energized, is retarded, the amount of retardation being adjustable as above pointed out.

Figure 7:
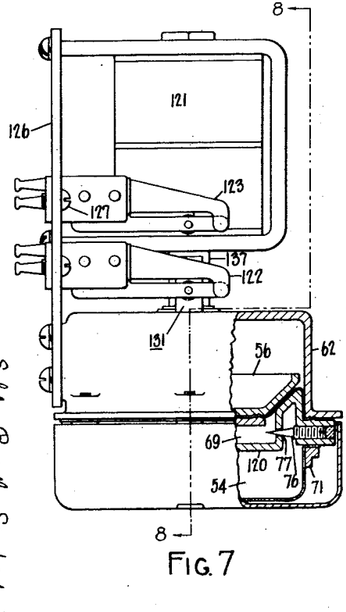
Figure 7 is a side view of the retarding device applied to another arrangement of switching mechanism, the retarding device being arranged to provide the retarding action on both the suction stroke and the compression stroke.
Figure 8:
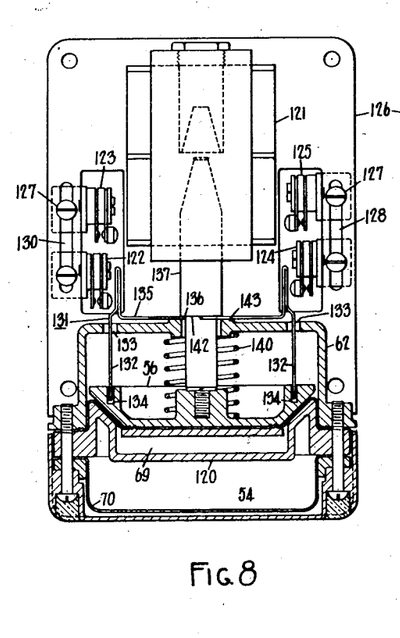
Figure 8 is a front view of the same, with parts in section, illustrating the mechanism in position ready to begin the suction stroke.
Figure 9:
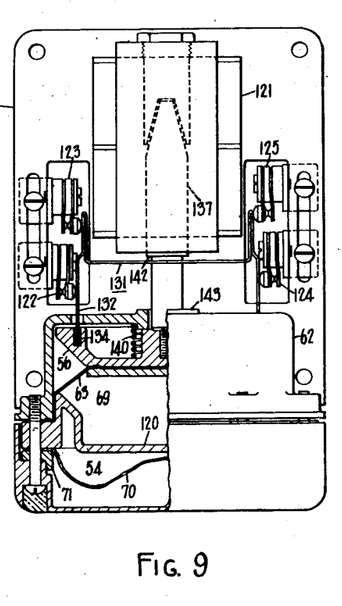
Figure 9 is a view of the same, similar to Figure 8, with the suction stroke of the retarding device completed.

Referring to Figures 7, 8 and 9, an arrangement is shown in which the retarding device provides a retarding action for both directions of movement of the operating plunger 56. The retarding action in both directions is obtained by omitting valve 74 and the aperture 72 in the valve head, designated 120 in Figures 7, 8 and 9. Otherwise, the construction of the retarding device is substantially the same as that illustrated in Figures 1 to 6 inclusive.

In the construction illustrated in Figures 7, 8 and 9, the retarding device is inverted and the operating electromagnet 121 for the switching mechanism is arranged above it. The switching mechanism comprises four sets of spring leaf contacts, 122, 123, 124 and 125, such as used in telephone work. These sets of contacts are adjustably mounted on base 126, as by clamping screws 127 extending through slots 128 and 130 formed in the base. These spring contacts are operated by a cam 131. This cam is formed from a strip of sheet metal bent to the desired shape. In the form illustrated, the cam comprises legs 132 which extend downwardly through apertures 133 in housing 62. These legs also extend into pockets 134 formed in operating plunger 56. Each of these legs is bent to form two camming sections, the upper section for operating the upper spring leaf contacts and the lower section for operating the lower spring leaf contacts. The portion 135 of the strip which joins the legs is enlarged at the center and provided with an aperture 136 through which the movable core 137 of magnet 121 extends.

A coil spring 140 is arranged within the housing between the operating plunger 56 and the base of the housing. This spring acts to return the operating plunger and magnet core 137, which is secured to the plunger, to their lowermost positions, illustrated in Figures 7 and 8. A shoulder 142 formed on core 137 acts, through connecting portion 135 of cam 131, upon the boss 143 formed on housing 62 to limit the downward movement of the core and plunger 56.

Upon energization of electromagnet 121, the core 137 is pulled upwardly, carrying with it the operating plunger 56 against the force of spring 140. The upward movement of the operating plunger increases the volume of air in chamber 69, thereby decreasing the air pressure and causing air to flow into this chamber through aperture 77 from chamber 54. The area of aperture 77 being restricted by needle valve 76, the transfer of air takes place at a slow rate, and therefore the upward movement of the operating plunger 56 and core 137 is retarded. Upon a slight amount of upward movement of operating plunger 56, the bottoms of pockets 134 engage the ends of legs 132, picking up the cam and causing it to be carried upwardly by the core 137. As this upward movement continues, the cam 131 engages the operating knobs of the various spring contacts, moving these contacts into engagement. The time of operation of the various spring contacts depends upon their setting with respect to the cam, the spring contacts being illustrated to be operated in a predetermined sequence. The upward movement of the core and operating plunger is stopped by the engagement of the plunger with the boss formed on housing 62. This position of the parts is illustrated in Figure 9.

Upon deenergization of electromagnet 121, spring 140, compressed by the upward movement of the operating plunger, starts to expand. The expansion of this spring acts to move the operating plunger and core downwardly, assisted by the action of gravity. As the operating plunger starts to move downwardly, it decreases the volume of air in chamber 69 and thereby increases the air pressure. This causes air to be transferred from chamber 69 to chamber 54. This transfer of air takes place through aperture 77 as in the case of upward movement of the plunger. The restricted area of this passage causes the transfer of air to take place at a slow rate, thus retarding the downward movement of the core and plunger. After a slight downward movement of the core, the shoulder 142 thereon picks up cam 131 to carry it downwardly. As this downward movement continues, the cam disengages the operating knobs of the leaf contacts, permitting these contacts to be separated. After the disengagement of the cam from the operating knob of the last pair of contacts, the legs 132 of the cam drop to the bottom of pockets 134 where they remain until the connecting portion 135 engages boss 143 on housing 62. The plunger and core continue their downward movement until the shoulder 142 on the core engages the connecting portion 135 on the cam, whereupon the downward movement of the parts is stopped. The rate of downward movement depends upon the design of spring 140 and, if desired, the spring and magnet may be designed in such manner that the upward and downward movements of the plunger and core are effected at the same rate.

Figure 14:
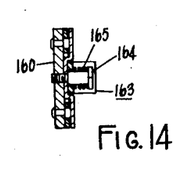
Figure 14 is a view in section taken along the line 14—14 of Figure 12.

The construction and arrangement of the retarding device illustrated for the arrangement shown in Figures 10 to 14 inclusive is the same as that illustrated in Figures 1, 2 and 3. The switching mechanism, however, is of a different construction. This switching mechanism comprises two pairs of normally engaged leaf contacts, these contacts being designated 150, 151, 152 and 153. The leaf contacts are mounted on brackets 154 secured to base 155, and are insulated from the brackets and from each other. Leaf contacts 150 and 153 are each provided with an operating knob 156. These operating knobs are positioned to be operated by levers 157 and 158 pivotally mounted on bracket 160 secured to base 155. These levers are biased by a spring 161 into positions to engage the corresponding operating knobs 156 and thus separate the contacts 150 and 153 from contacts 151 and 152, respectively. A catch 162, formed on a latch device 163 pivoted to bracket 160 by screw 164 as shown in Figure 14, is biased by spring 165 into position to co-operate with shoulders 166 on levers 157 and 158 to latch these levers in the positions shown in Figure 12, where they are disengaged from operating knobs 156.

Figure 10:
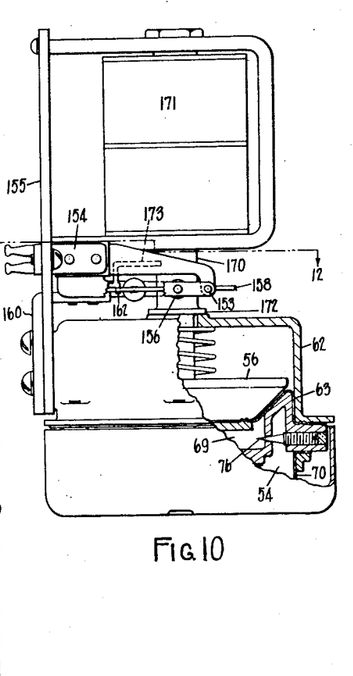
Figure 10 is a view similar to Figure 7 of the retarding device applied to still another form of switching mechanism, the retarding device being of the same construction as that of Figure 1.
Figure 11:
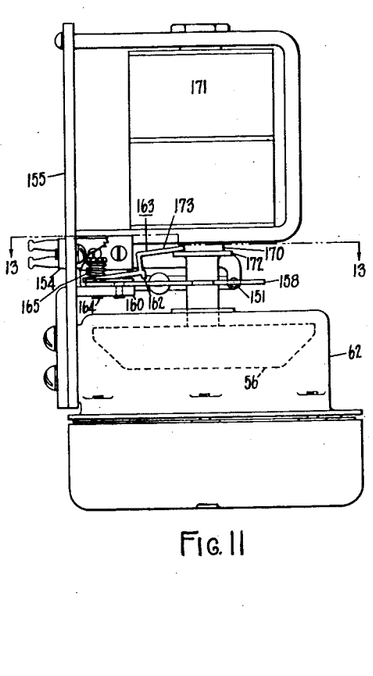
Figure 11 is a view similar to Figure 10, with the switching mechanism operated.

The upward movement of the magnet core 170 upon energization of electromagnet 171 is retarded and, upon the engagement of flange 172 on the core with extension 173 of latch device 163, the latch device is moved upward about its pivot against the force of spring 165. This releases the catch 162 from shoulders 166, permitting spring 161 to move levers 157 and 158 outwardly into positions to engage operating knobs 156 and move the leaf contacts 150 and 153 into positions disengaging contacts 151 and 152. Upon the return of the core to its lowermost position after deenergization of electromagnet 171, the switching mechanism may be reset by squeezing levers 157 and 158 together manually against the force of spring 161 to permit catch 162 to be forced downwardly over the shoulders 166 by spring 165, latching these levers in contact disengaging positions.

Figure 12:
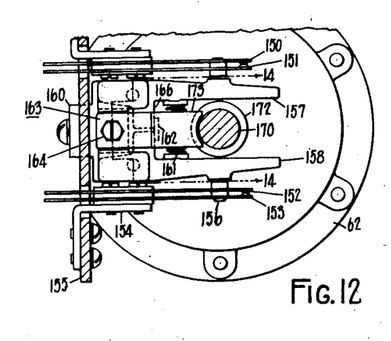
Figure 12 is a view in section taken along the line 12—12 of Figure 10, illustrating the construction of the switching mechanism.
Figure 13:
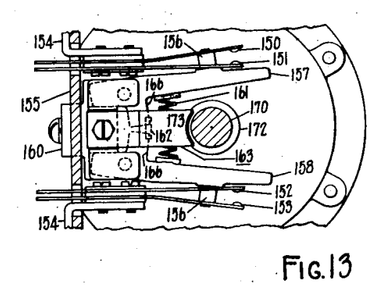
Figure 13 is a view similar to Figure 12 taken along the line 13—13 of Figure 11.

Switching mechanisms suitable for various purposes have been illustrated. The arrangements of Figures 1, 2 and 3 and of Figures 4, 5 and 6 are suitable for various time delay operations, depending upon whether it is desired to provide the retarding action after the energization of the electromagnet or after its deenergization. In the field of elevators, these arrangements are particularly suitable for causing the automatic starting and stopping of motor generator sets, for providing any time delay desired in controlling the operation of the elevator car, and the like. The arrangement shown in Figures 7, 8 and 9 is particularly suitable for controlling the acceleration and/or retardation of hoisting motors for elevators. However, it has general application and is suitable for use wherever multiple switching mechanisms, particularly of the type in which the various contacts operate in sequence, are desired. The arrangement shown in Figures 10, 11 and 12 is particularly useful as an overload relay, but is not limited to this field of usefulness.

The timing of the stroke of the operating plunger 56 of the retarding device may be varied by adjusting needle valve 76. The range of adjustment is very wide and the device can be set to provide the timing desirable for almost any useful purpose, settings wherein the timing may be varied from a fraction of a second to a half hour being obtainable.

The retarding device, per se, being sealed against dirt and dust by the arrangement of the membranes 63 and 70, assures a retarding action which is the same for every operation. In addition, this arrangement obviates any variations in retarding action due to temperature or humidity changes. A retarding device such as illustrated in Figures 3, 4 and 5 has been and is still being tested. To date, there have been over five million operations without a breakdown or any faulty operations whatsoever, the timing of the retarding device remaining constant for the setting of the needle valve over the whole testing period.

Although illustrated and described as applied to switching mechanisms, the retarding device is of general application. For example, in elevator work, the retarding device may be used to retard the application of the electromechanical brake for the hoisting motor. Also, the construction of the retarding device may be varied without departing from the scope of the invention.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:—

1. A retarding device comprising; a pair of flexible membranes; partitioning means between said membranes and cooperating therewith to form chambers, said partitioning means providing communication between said chambers; fluid in said chambers; means for sealing said membranes to said partitioning means; means for moving one of said membranes to cause the transfer of fluid to and from one of said chambers to the other; and means for restricting the transfer of fluid between said chambers at least during movement of said one membrane in one direction, thereby retarding the movement of said moving means when moving said one membrance in that direction.

2. A retarding device comprising; a pair of membranes of flexible material; a partitioning member between said membranes; means securing said membranes to said partitioning member in such manner as to exclude dust and dirt from the chambers formed by said membranes and said partitioning member, said partitioning member being provided with an aperture connecting said chambers; a valve for adjustably restricting the flow of air through said aperture; and means for moving one of said membranes in the manner of a bellows to cause the transfer of air to and from one of said chambers to the other, said valve acting during such movement of said one membrane to restrict the flow of air between said chambers through said aperture.

3. A retarding device comprising; a pair of membranes of flexible material; a partitioning member between said membranes; means securing said membranes to said partitioning member in such manner as to exclude dust and dirt from the chambers formed by said membranes and said partitioning member, said partitioning member being provided with two passages connecting said chambers; a needle valve for adjustably restricting the flow of air through one of said passages; a check valve for controlling the flow of air through the other passage; and means for moving one of said membranes in the manner of a bellows to cause the transfer of air to and from one of said chambers to the other, said check valve permitting the unrestricted flow of air through the passage controlled thereby during movement of said one membrane in one direction but acting during movement of said one membrane in the other direction to close its passage and thus restrict the flow of air between said chambers to said passage controlled by said needle valve, thereby retarding the movement of said moving means when moving said one membrane in that direction.

4. A retarding device comprising; a housing having an open end; a flexible membrane in said housing; means securing said membrane over the open end of said housing; a plunger in said housing and secured to said membrane to cause said membrane to act as a bellows upon movement of said plunger within said housing; a flexible membrane over said securing means for the first mentioned flexible membrane, said securing means and said first mentioned membrane forming a chamber on one side of said securing means and said securing means and the second mentioned membrane forming a second chamber on the other side of said securing means, said securing means being provided with apertures connecting said chambers; a needle valve for adjustably restricting the flow of air through one of said apertures; a check valve for admitting air from one of said chambers to the other through the other of said apertures; and means for moving said operating plunger in said housing, said operating plunger, upon being moved in one direction, causing said first named membrane to force air from the first mentioned chamber to the second and, upon being moved in the opposite direction, causing said first named membrane to draw air from said second chamber to the first, said check valve acting during movement of said plunger in one of said directions to restrict the flow of air between said chambers to said aperture, thereby retarding said movement of said plunger.

5. A retarding device comprising; a housing in the form of a circular cup, said housing having a flange at its open end; a valve head secured to said housing over the open end thereof; a membrane of thin, soft, flexible leather in said housing secured between said flange and said valve head, said head extending partially into said housing and causing said membrane to fit snugly against the wall of said housing; an operating plunger in said housing; a disc in said housing, said membrane being secured between said disc and said plunger, said disc being of a diameter and said head extending sufficiently into said housing to cause said membrane to act as a diaphragm upon movement of said plunger within said housing; a membrane of thin, soft, flexible leather secured over said valve head, said valve head having an aperture communicating between the chamber formed by said first named membrane and said valve head and the chamber formed by said second named membrane and said valve head; a needle valve for adjustably restricting the flow of air through said aperture; a check valve for admitting air from the first named chamber to the second; and means for moving said operating plunger in said housing, said operating plunger, upon being moved in one direction, causing said first named membrane to increase the pressure of the air within the first named chamber to lift the check valve and thus permit unrestricted flow of air from said first chamber into the other, thereby permitting unrestricted operation of said plunger, and, upon being moved oppositely, causing said first named membrane to decrease the air pressure within said first chamber causing air to be returned thereto from said second chamber, said check valve causing the return flow of air to be restricted to said passage in said valve head whereby the return movement of said plunger is retarded.

SELDEN BRADLEY SANFORD.